United States Patent [19]

Allen et al.

[11] 3,926,175

[45] Dec. 16, 1975

[54] IMPLANTABLE VALVE FOR MEDICAL PURPOSES

[76] Inventors: James H. Allen, 4282 Senisa, Irvine, Calif. 92664; Frederic L. Green, 110 Sea View Drive, El Cerrito, Calif. 94530

[22] Filed: June 3, 1974

[21] Appl. No.: 475,528

[52] U.S. Cl................ 128/1 R; 3/1; 128/DIG. 25; 128/346; 251/7; 251/9; 251/65
[51] Int. Cl.².................. A61B 19/00; A61F 1/24
[58] Field of Search..... 128/1 R, 346, 325, DIG. 25, 128/274; 251/7, 9, 65, 75; 3/1

[56] References Cited
UNITED STATES PATENTS

| | | | |
|---|---|---|---|
| 3,264,884 | 8/1966 | Brooker | 251/75 X |
| 3,419,008 | 12/1968 | Plishner | 128/346 |
| 3,426,800 | 2/1969 | Bauer | 251/75 X |
| 3,635,251 | 1/1972 | Gaines | 251/75 X |
| 3,815,576 | 6/1974 | Balaban | 128/1 R |
| 3,817,237 | 6/1974 | Bolduc | 128/1 R |

*Primary Examiner*—Dalton L. Truluck
*Attorney, Agent, or Firm*—Gordon L. Peterson

[57] ABSTRACT

A valve is provided which is intended to be implanted in the body of a human or animal and which is intended to be used to control the flow of body fluid through a conduit. The valve may be used, for example, for bladder control, or for restricting or stopping blood flow through a blood shunt. The valve of the invention has the feature of being capable of being implanted in the body around the particular conduit to be controlled without any necessity of ligating the conduit; and of being capable of remote actuation so that the valve may be opened and closed by a magnetic unit, or the like, positioned externally of the body in which the valve is implanted.

10 Claims, 6 Drawing Figures

IMPLANTABLE VALVE FOR MEDICAL PURPOSES

BACKGROUND OF THE INVENTION

Valves have been provided in the past which are intended to be implanted in humans or animals. One type of such valve, for example, serves to provide bladder control for persons who have become incontinent due to surgery, or for other reasons. However, such prior art bladder control valves, for the most part, are cumbersome and large, and are difficult to implant and to control. Also, the prior art valves of this type have a tendency to produce necrosis.

SUMMARY OF THE INVENTION

The valve of the present invention may be used for both medical and nonmedical purposes. However, in one of its aspects, the valve is constructed to control the bladder of incontinent persons, and it is designed to be implanted around the urethra, this being achieved without the necessity for ligation, i.e., severing of the urethra, or for any part of the valve to be inserted into the urethra. The valve of the invention may be operated manually, or by external magnetic means. The valve produces a sufficient force to close the urethra, yet not sufficient to create necrosis. Necrosis is prevented, for example, by limiting the pressure applied by the valve to the urethra, as well as by controlling the shape assumed by the urethra when collapsed by the valve. Specifically, the valve of the invention is constructed so that when it is actuated, pressure is applied diametrically across the urethra, rather than in a noose-like complete pattern. In this way, blood circulation can still continue after the urethra has been collapsed, and necrosis can be prevented.

The valve of the invention may be used for many other purposes such as stopping or restricting the flow of blood through a blood shunt which has been installed in the body. The valve is implanted without requiring ligation of the shunt, after shunt surgery is completed, and just before the wound is sutured. The implanted blood shunt valve can then be operated remotely from a point outside the body without the necessity for further surgery.

The valve of this invention can advantageously include a circumscribing structure adapted to at least substantially circumscribe the conduit. To facilitate installation of the circumscribing structure on the conduit without requiring ligation of the conduit, the circumscribing structure may be separable. The circumscribing structure can be made separable in various ways such as by making it of several sections so that it can be assembled around the conduit. Alternatively, the circumscribing structure may be, in effect, hinged and/or resilient to allow it to be placed in belt or bracelet type fashion around the conduit.

The circumscribing structure can advantageously include a body section adapted to at least partially circumscribe the conduit and a movable section. Means are provided for mounting the movable section on the body section. The movable section is movable relative to the body section along a path having a radial component between first and second positions. The first position is radially outwardly of the second position.

In the second position, the movable section and the body section compressively load the conduit to restrict or prevent flow of fluid therethrough. The conduit in turn exerts a radial outward force on the movable section. The present invention provides means for retaining the movable section in the second position. Such means may include a detent. However, in a preferred construction such means includes an over center device which tends to retain the movable section in whichever position it is placed.

The over center device may take different forms. In a preferred construction, the body section includes first and second arms, at least one of which is resilient. First and second hinges hingedly join the opposite ends of the movable section to the first and second arms, respectively. With this construction, the hinges, the resilient arm, and the movable section cooperate to at least partially define the over center device, and accordingly the movable section is restrained in whichever of the first and second positions it is placed.

The movable member may be controlled manually or externally of the body. External control can be accomplished by associating magnetizable material with the movable member. Accordingly, by appropriately positioning a magnet externally of the body, the movable member can be moved to either the first or second position.

To prevent necrosis, the valve of this invention applies forces to generally oppositely located regions of the conduit rather than in a noose-like complete circular pattern. To accomplish this, the movable section and the body section have generally oppositely located portions, and the circumscribing structure defines an expansion chamber. With the movable section in the second position, the oppositely located portions of the movable section and the body section compressively engage the conduit to restrict flow of fluid therethrough. This tends to cause other portions of the conduit to move or expand radially outwardly into the expansion chamber. The expansion chamber is appropriately sized and positioned to receive such outward movement of the conduit without applying compressive forces to it of such a magnitude that necrosis would occur.

As indicated above, the valve of this invention has many different uses. However, according to the method of this invention, the valve is implanted within the body of a human or animal and thereafter utilized to control the flow of fluid through a conduit of the body.

The invention can best be understood by reference to the following illustrative drawings.

DETAILED DESCRIPTION OF THE ILLUSTRATED EMBODIMENTS

Figure 1:
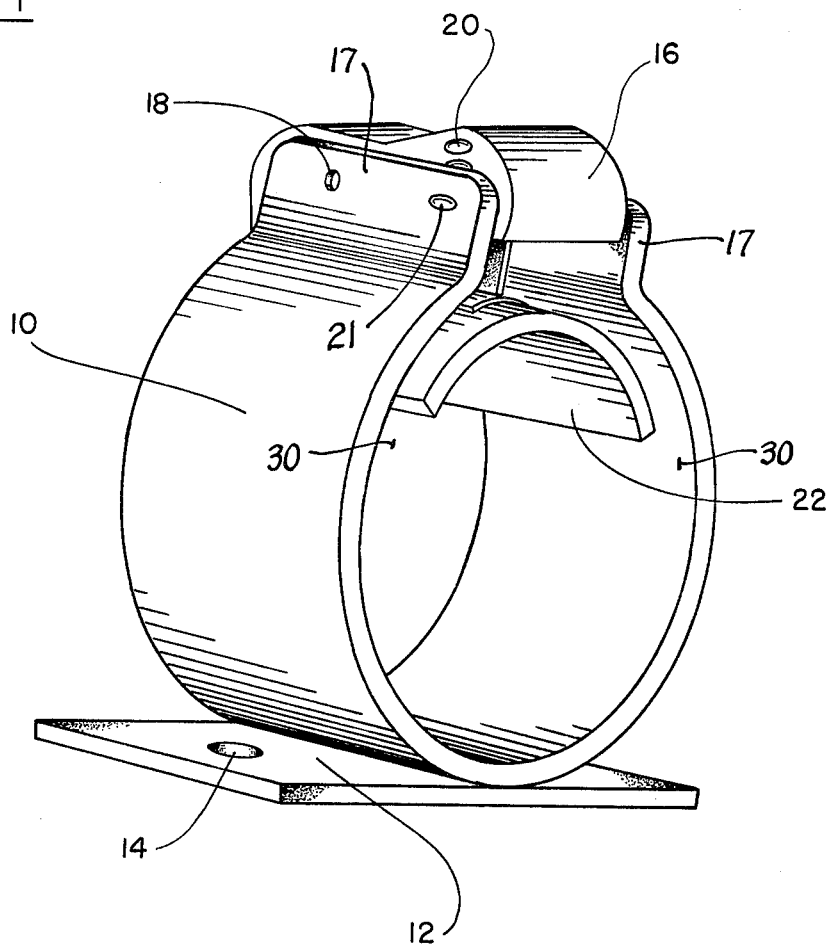
FIG. 1 is a perspective representation of one embodiment of the valve of the present invention.

The valve of FIG. 1 includes a generally annular and resilient body section 10 which is formed of any desired size or shape, and of any appropriate material. For example, the body section 10, as well as the other components of the valve may be formed of plastic or metal. If the valve assembly is formed of metal, it is preferably to encase the metal in sylastic, silicone, Teflon, or the like, to minimize fibrosis. A flat base section 12 is attached to the body section 10. The base section has mounting holes 14 which permit the valve to be sutured in place, when embedded in the body, so as to prevent rotation or other movement of the valve.

A beam 16 is positioned in a gap 16a formed in the body section 10 diametrically opposite to the base 12. The beam 16 is pivotally mounted on flanges 17 of the body section 10 by a pin 18. Appropriate recesses 20 formed on the side of the beam 18 cooperate with dimples or projections 21 in the flanges 17 to form a detent which permits the beam to be releasably held at various angular positions. The beam 16 may be moved from one angular position to the next, either manually, or by an appropriate external magnet (not shown). When an external magnet is used, magnetic material or another magnet is embedded in, or otherwise drivingly associated with, the beam 16 so that necessary magnetic attraction and repulsion may be set up to turn the beam in one direction or the other. A movable section in the form of a platen section 22 is attached to the beam 16, and the platen section moves in a generally radial direction within the body section 10, as the beam 16 is turned about the pin 18.

Figure 2:
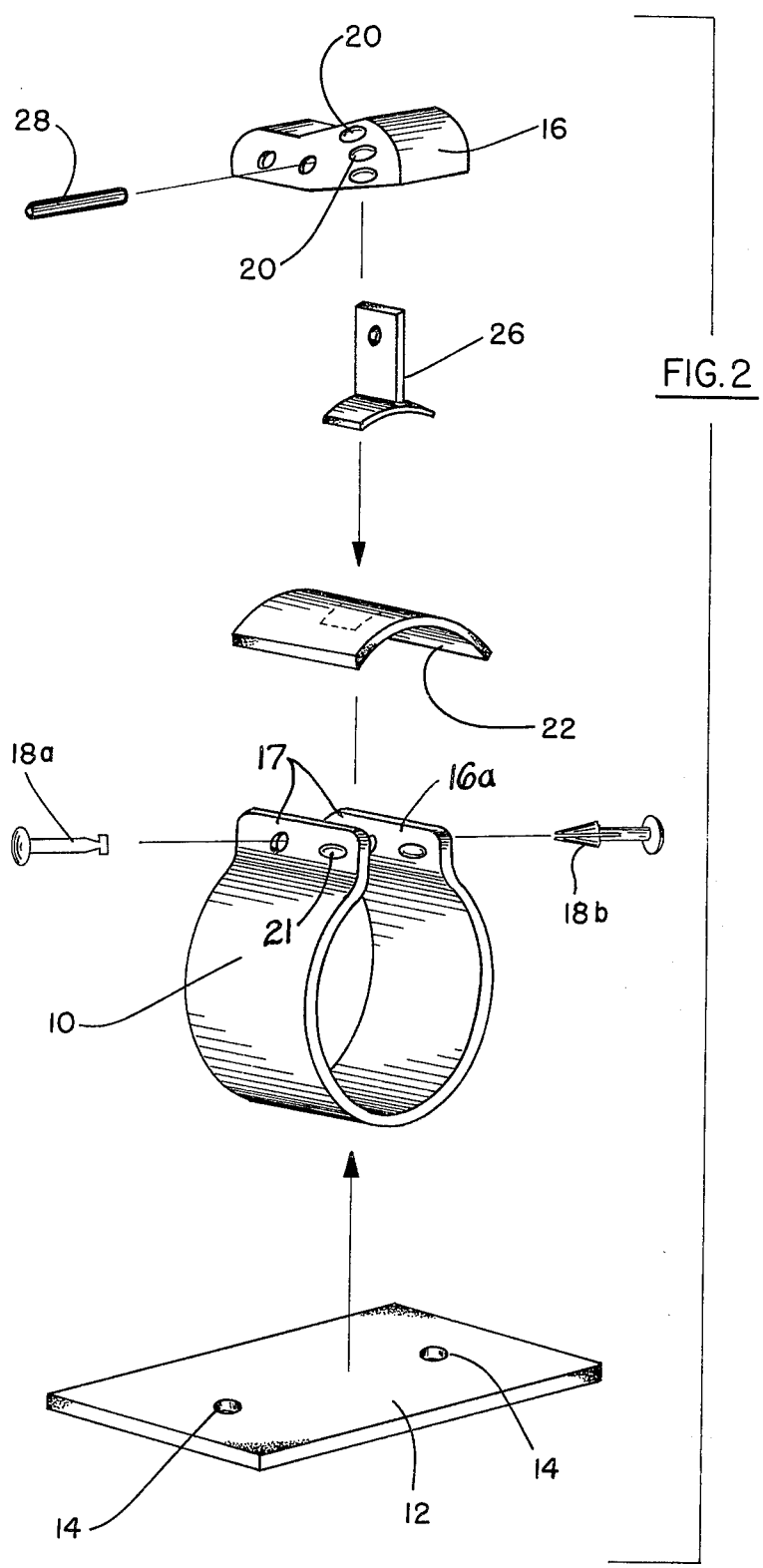
FIG. 2 is a perspective exploded representation of the valve of FIG. 1, illustrating the various components which make up the valve.

The various components of the valve of FIG. 1 are more clearly shown in the exploded representation of FIG. 2. As shown in FIG. 2, the pin 18 is actually formed of two mating sections 18a and 18b. The platen section 22 is in the form of a curved plate and is attached to the beam 16 by a bracket 26. The bracket 26 is affixed to the platen 22, and it is pivotally attached to the beam 16 by means, for example, of a pin 28.

The platen section 22 extends circumferentially of the body section 10 for a relatively short distance and is located radially inwardly of the body section 10. The platen section 22 is mounted for movement by the bracket 26 and the beam 16 for movement toward and away from a diametrically opposed portion of the body section 10.

The valve assembly of FIG. 1 is adapted to be implanted in the body of a human or animal. To install the valve, the valve should be in a disassembled condition, i.e., the beam 16, the bracket 26, and the platen section 22 should not be installed on the body section 10. The flanges 17 are then pulled apart as permitted by the resilience of the body section to widen the gap 16a sufficiently to allow the conduit about which the valve is to be mounted to pass therethrough. The beam 16, with the bracket 26 and the platen section 22 affixed thereto, is then mounted on the body section 10 utilizing the pin 18. In this manner, the valve is mounted on the conduit without any need for ligation of the conduit. The valve may be sutured in place within the body utilizing the holes 14.

In use, depressing the forward end of the beam 16 as viewed in FIG. 1 pivots the beam and moves the platen section 22 radially inwardly to apply a radial inward force on the conduit which is circumscribed by the valve. The body section 10, the platen section 22, and the means for mounting the platen section on the body section constitute circumscribing structure which completely surrounds the conduit. Accordingly, radial inward movement of the platen section 22 radially squeezes the conduit between the diametrically opposed portions of the platen section 22 and the body section to restrict or prevent flow of liquid through the conduit. This causes radial outward movement of other portions of the conduit into expansion chambers 30 which lie within the body section 10, but outside of the portions of the sections 10 and 22 which squeeze the conduit. The portions of the conduit in the expansion chambers 30 are not squeezed. Similarly, by pivoting the beam 16 in the opposite direction about the pin 18, the platen section 22 is moved radially outwardly to an open position in which the conduit is substantially unrestricted. Thus, in the embodiment of FIGS. 1 and 2, the valve of the invention includes a beam section and associated detent means which permit positioning of the platen section 22 in several radial positions, and in which movement of the beam 16 lowers or raises the platen section. The platen section 22 can be any shape, such as concave, convex or flat, depending on the application.

As an alternative the valve of FIG. 1 may be controlled mechanically by an appropriate remote means. The body section 10 of the valve of the first embodiment may be as shown, or it may be tapered, or assume any other appropriate configuration. It has been found that a tapered body section is more appropriate for female bladder control, since a tapered shape is more appropriate for accommodating the shape of the female urethra and for allowing positioning of the valve during surgery to the most suitable location.

Figure 3:
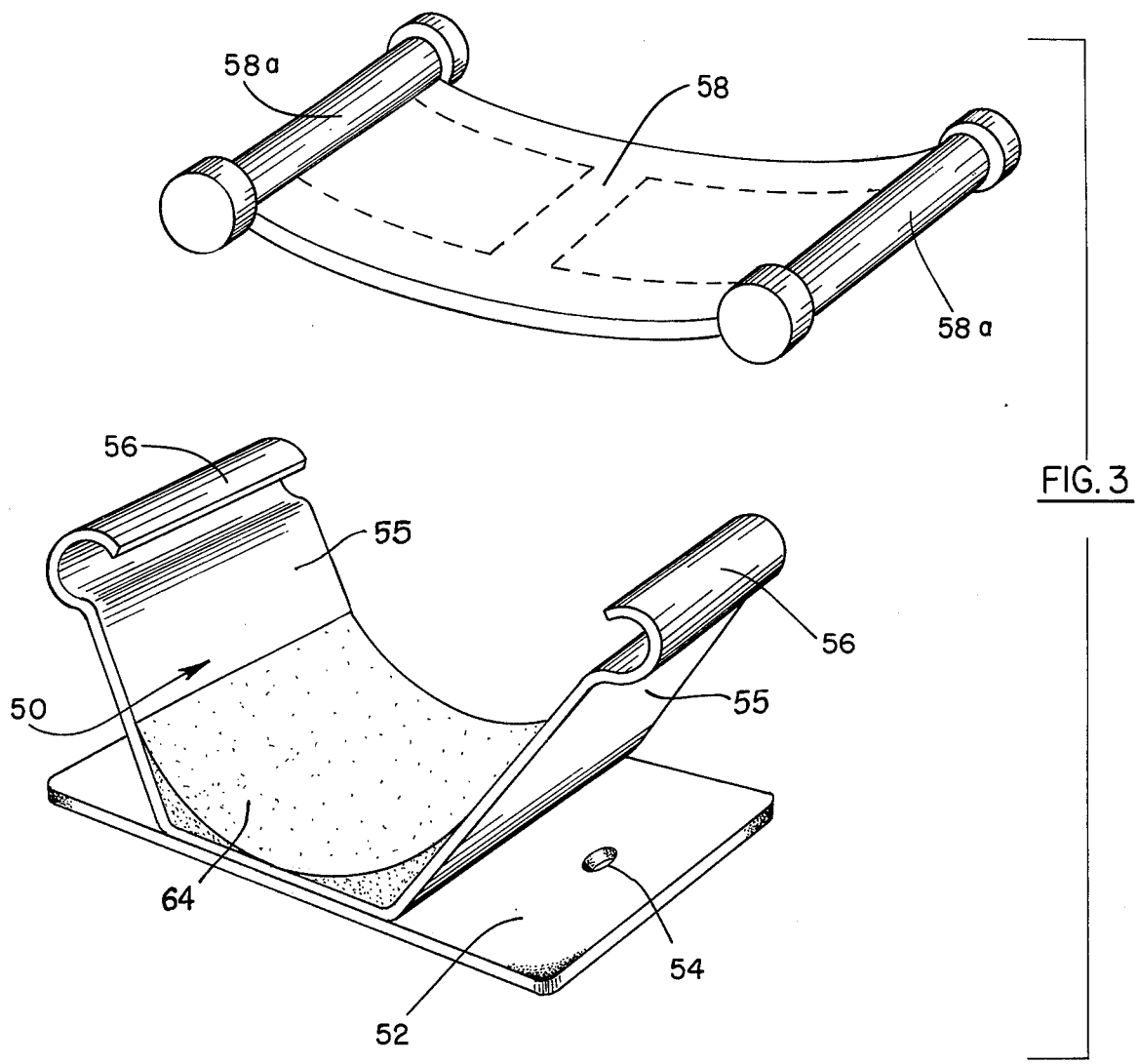
FIG. 3 is an exploded perspective representation of a valve constructed in accordance with a second embodiment of the invention.
Figure 4:
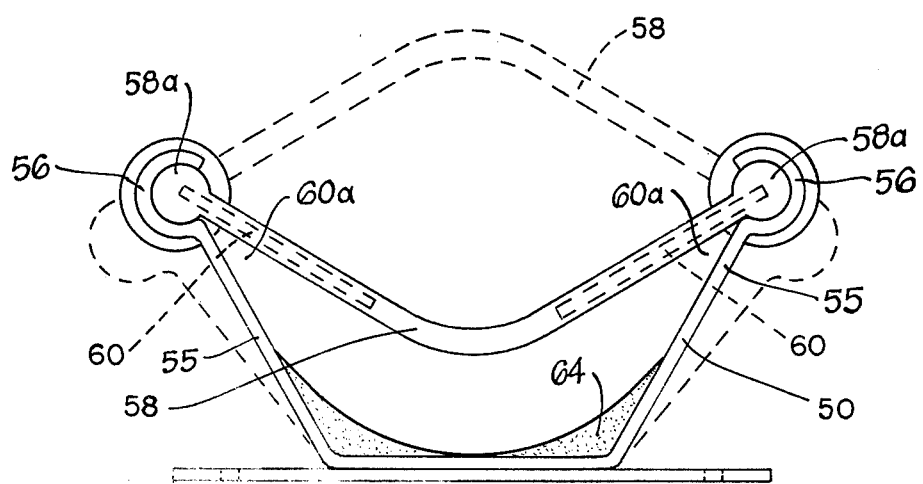
FIG. 4 is a side view of the valve of FIG. 3, with solid lines showing the valve in a closed condition, and with broken lines showing the valve in an open condition.

FIGS. 3 and 4 show a valve which differs from the valve of FIGS. 1 and 2 in that it employs an over center device for retaining the movable section in position. In the embodiment of FIGS. 3 and 4, the valve assembly includes a resilient body section 50 and a base 52, the base having mounting holes, such as the mounting holes 54 therein. The body section 50 is generally trough shaped and includes upwardly extending resilient arms 55. The body section 50 includes supporting means in the form of longitudinal curved channels 56 at each edge, and these channels receive a movable section or platen section 58 which in this embodiment is a resilient strip member. The movable section includes curved end bearing portions 58a which are slidably receivable in the channels 56 to define hinges. The valve may be operated as an over center device. That is, the assembly may have a closed position, as represented by the solid lines, and in which the movable section 58 assumes a limiting inner radial position. The assembly may also have an open position, as represented by the broken lines, in which the platen section 58 assumes a limiting outer radial position. Appropriate magnets or magnetizable material, such as represented by the members 60, may be embedded in, or otherwise drivingly interrelated with, the movable member 58 to permit remote magnetic control of the valve by appropriate external magnetic means.

With this construction, a portion of the movable section 58 is movable toward and away from a diametrically opposite portion of the body section 50. The body section 50 and the movable section 58 also define expansion chambers 60a. Resilient material 64 is attached to or molded integrally with the body section 50 and forms a portion thereof. The resilient material 64 has a curved surface adapted to confront the conduit. The resilient material 64 may be any material which is compatible with the material of the body section 50 and which is approved for use within human or animal bodies.

In use, the body section 50 is first sutured in place utilizing the holes 54 and with the body section partially receiving the conduit. Next, the movable section 58 is resiliently deflected sufficiently to allow the end bearings 58a to be slid into the curved channels 56. The valve of this embodiment may be implanted in this manner around the urethra, or other conduit within the body without requiring ligation.

In operation, the movable section 58 may be moved radially between an open position shown in dashed lines in FIG. 4 and a closed position shown in solid lines in FIG. 4. In moving the movable section 58 from the open position to the closed position, a radial inward force is applied to the central area of the movable section. This causes the arms 55 to spread outwardly away from each other to the dashed line position shown in FIG. 4. This permits the movable section 58 to move through center to the inner position. The resilience of the arms 55 tends to maintain the movable section 58 in the inner position. By urging the central region of the movable section 58 radially outwardly, the action described above can be reversed, and the resilience of the arms 55 holds the movable section in the outer position. The movement of the movable section 58 between the outer and inner positions may be accomplished manually or by appropriately positioning a magnet relative to the magnetizable material 60. The bearings 58a can rotate within the channels 56 as the movable section 58 is moved between the outer and inner positions thereof.

The body section 50 and the movable section 58 at least partially define circumscribing structure which substantially circumscribes the conduit. Accordingly, with the movable section 58 in the inner position, the circumscribed conduit is radially squeezed by the oppositely located portions of the body section 50 and the movable section 58 to restrict or prevent flow therethrough. Resulting radial outward movement of other portions of the conduit are accommodated by the expansion chambers 60a. The conduit portions within the expansion chambers 60a are substantially unsqueezed, and therefore the conduit is only locally pinched, and the application of noose-like forces is avoided.

The movable section 58 can be provided in various different configurations depending upon the application and individual patient requirements. As in the first embodiment, blood circulation is still present when the valve of FIGS. 3 and 4 is closed due to the fact that pressure is applied to two diametrically opposite sides of the conduit rather than in a complete circular pattern.

Figure 5:
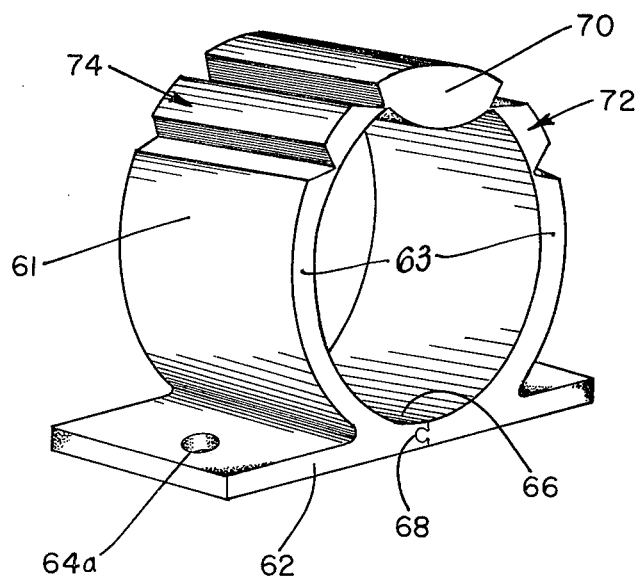
FIG. 5 is a perspective representation of another embodiment of the valve.
Figure 6:
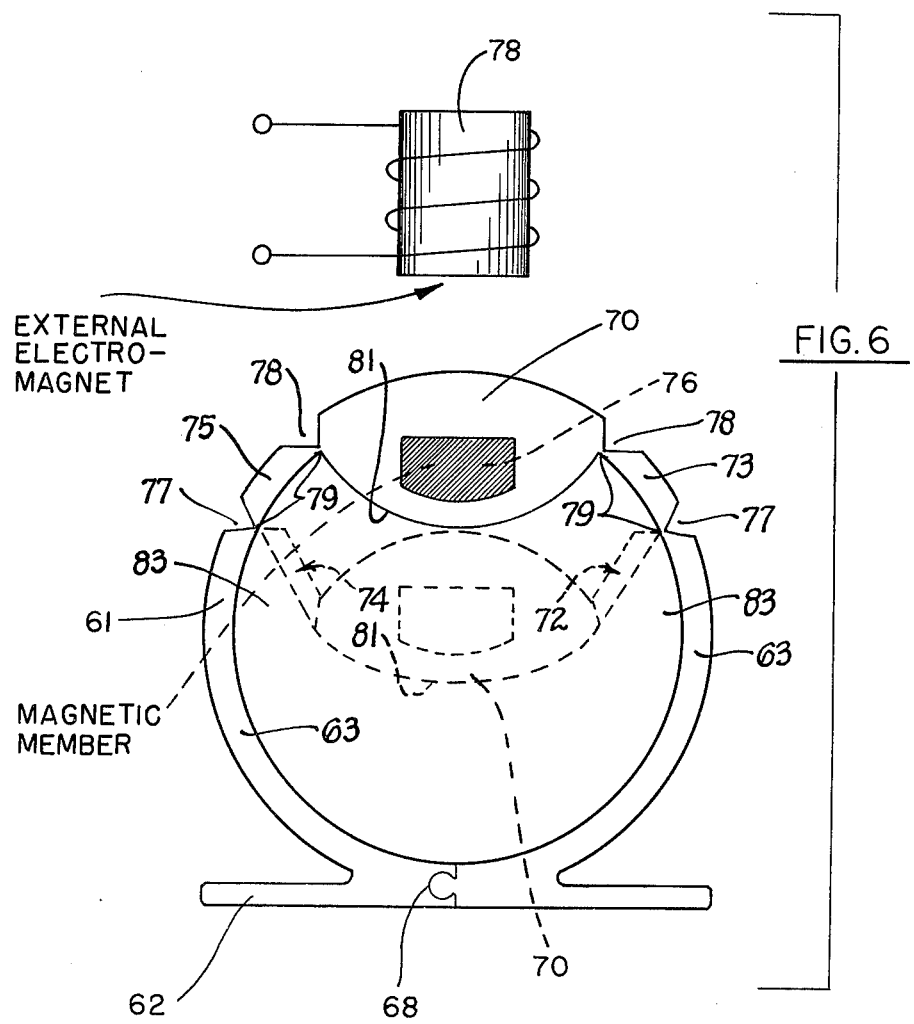
FIG. 6 is an end view of the valve of FIG. 5, and a schematic view of an external electromagnet for controlling the valve. The valve is shown in the open and closed positions by solid and dashed lines, respectively.

The embodiment of FIGS. 5 and 6 includes a resilient body section 61 and base section 62 integral with the body section. The body section 61 has resilient arms 63. The base section 62 has mounting holes, such as the holes 64a. The body section 61 and base section 62 are constructed to be parted along an axially extending parting line 66, and are normally releasably held in a closed position by a resilient integral clasp 68 formed in the abutting edges of the body section 61.

The valve has an integral construction, with a movable section or platen section 70 being hinged to the body section 61 by a pair of hinges 72 and 74. Although the hinges 72 and 74 may be of various different configurations and materials, in the embodiment illustrated in FIGS. 5 and 6, the entire valve is constructed of resilient self-hinging plastic material such as polypropylene. Thus, the body section 61, the hinges 72 and 74, and the movable section 70 each form a portion of the periphery of a circumscribing structure which is adapted to circumscribe a conduit of the body. Each of the hinges 72 and 74 is identical and includes an axially extending segment 75 interposed between one of the arms 63 and the movable section 70. The material between each of the segments 75 and the arm 63 and the movable section 70 is removed to form outwardly opening grooves 77 and 78, respectively. The grooves 77 and 79 form hinge lines 79 along the opposite axially extending edges of the section 75.

The valve is such that the movable section 70 operates on the over center spring principle to assume either an outer limiting position such as shown by the solid lines in FIG. 6, or an inner limiting radial position such as shown by the broken lines in FIG. 6. A permanent magnetic member 76 may be embedded in the movable section 70 for external control of the valve by means, for example, of an external electromagnet, represented as 78. The polarity exhibited by the external electromagnet 78 is controlled either to attract the movable section 70 to the outer position in FIG. 6, or to repel the movable section 70 to the illustrated inner position thereof. Alternatively, the member 76 may be constructed of unmagnetized magnetic material. In this event the movable section 70 can be moved to the outer position by energizing the electromagnet 78 when the electromagnet is in the position shown in FIG. 6. Similarly, the movable section 70 can be moved to the inner position by energizing the electromagnet 78 when the electromagnet is in a position spaced 180° from the position shown in FIG. 6.

The movable section 70 is diametrically opposite to a portion of the body section which contains the clasp 68. The movable section 70 has a convex inner surface 81, the central region of which is movable toward the oppositely located portions of the body section 61. In the closed position of the valve, the body section 61, the hinges 72 and 74, and the outer portions of the surface 81 define expansion chambers 83.

The valve of FIGS. 5 and 6 is installed by parting the body section 61 along the parting line 66, as permitted by the hinges 72 and 74 and the resilience of the body section 61, and by then positioning it around the conduit to be controlled. The body section 61 is then snapped together, and is held together by the clasp 68. As mentioned above, the valve of FIGS. 5 and 6 is particularly adapted for blood shunt control, and is installed after shunt surgery is complete, and just prior to the closure of the wound. Then, after the wound has healed, the valve may be controlled to open or close the shunt, at will, without the necessity for further surgery.

If a radial inward force is applied to the movable section 70 when the latter is in the outer position, the arms 63 are urged resiliently outwardly. As the movable section 70 moves radially inwardly, the segments 75 pivot about the hinge lines 79. Once the movable section 70 is moved through center, the resilience of the arms 63 urges the movable section to the inner position and tends to maintain it in the inner position. Thus, the valve of FIGS. 5 and 6 operates as an over center device. In moving the movable section 70 to the outer position, the operation is substantially the same.

In the closed position, portions of the conduit are squeezed between the central region of the surface 81 and the oppositely positioned portion of the body section 61 to restrict or prevent flow of fluid through the conduit. This results in radial outward movement of other portions of the conduit, and this is readily accommodated by the expansion chambers 83. As with the above-described embodiments, the portions of the conduit within the expansion chambers 83 are not squeezed at all or to such an extent that necrosis results. Accordingly, necrosis is prevented in that blood flow through at least these portions of the conduit is at least substantially unimpeded.

The invention provides, therefore, an improved valve assembly which is intended for medical purposes, and which is constructed to be implanted within the body of a human being or an animal. The valve assembly of the invention has an advantage in that it may be controlled externally, and also in that it exerts an appropriate control on the conduit without necrosis.

While particular embodiments of the invention have been shown and described, modifications may be made. It is intended in the claims to cover the modifications which come within the spirit and scope of the invention.

We claim:

1. A valve adapted to be implanted in the body of a human or animal to control the flor of a fluid through a conduit, said valve comprising:
   a circumscribing structure adapted to at least substantially circumscribe the conduit, said circumscribing structure being separable to permit the circumscribing structure to receive the conduit without requiring ligation of the conduit;
   said circumscribing structure including a body section adapted to at least partially circumscribe the conduit and a movable section;
   means for mounting said movable section on said body section;
   said movable section being movable relative to said body section along a path having a radial component between first and second positions, said first position being radially outwardly of said section position whereby said circumscribing section can compressively load and restrict the flow of fluid through the conduit in said section position; and
   said body section having at least one resilient portion, said resilient portion being cooperable with said movable section to at least partially define an over center device whereby said movable section tends to remain in whichever of said first and second positions it is placed.

2. A valve as defined in claim 1 wherein portions of said body section and said movable section are located generally opposite to each other, said circumscribing structure defines an expansion chamber spaced circumferentially from said portions of said body section and said movable section, said portions of said body section and said movable section being adapted to compressively load and restrict flow of fluid through the conduit in said second position and to cause movement of portions of the conduit into said expansion chamber whereby the valve can control flow of fluid through the conduit without applying noose-like forces to the conduit.

3. A valve as defined in claim 1 wherein said valve includes magnetizable material drivingly coupled to said movable member to permit magnetic control of the movable section externally of the body.

4. A valve as defined in claim 1 wherein the movable section and the body section are separate members which can be assembled around the conduit whereby the circumscribing structure is separable.

5. A valve as defined in claim 1 wherein said circumscribing structure includes first and second separable portions, said valve including means for interconnecting said first and second portions.

6. A valve as defined in claim 1 including means defining a base section on said circumscribing structure generally opposite said movable section and means on said base section to facilitate attachment of the valve to the body.

7. A valve as defined in claim 1 wherein said resilient portion includes a first resilient arm, said body section includes a second resilient arm adapted to partially circumscribe said conduit, said mounting means includes a first hinge for hingedly connecting the movable section to said first arm and a second hinge for hingedly connecting said movable section to said second arm, said resilient arms, said movable section, and said hinges cooperating to at least partially define said over center device whereby said movable section is held in whichever of said first or second positions it is placed.

8. A valve adapted to control the flow of a fluid through a deformable conduit, said valve comprising:
   a circumscribing structure adapted to at least substantially circumscribe the conduit,
   said circumscribing structure including a body section adapted to at least partially circumscribe the conduit and a movable section;
   said body section including first and second arms adapted to at least partially circumscribe the conduit, at least one of said arms being resilient;
   first hinge means for hingedly joining said movable section and said first arm;
   second hinge means for hingedly joining said movable section and said second arm to thereby mount said movable section for generally radial movement between a first position and a second position with the second position being radially inwardly of the first position whereby in the second position the valve can restrict the flow of fluid through the conduit; and
   said first hinge means, said second hinge means, the resilient arm, and said movable section at least partially defining an over center device whereby said movable section tends to remain in whichever of said first and second positions it is placed.

9. A valve as defined in claim 8 wherein said movable section includes magnetizable material to allow said movable section to be moved magnetically to at least one of said positions thereof.

10. A valve as defined in claim 8 wherein portions of said body section and said movable section are located generally opposite to each other, said circumscribing structure defining an expansion chamber spaced circumferentially from said portions of said body section and said movable section, said portions of said body section and said movable section being adapted to compressively load and restrict flow of fluid to the conduit in said second position and to cause movement of portions of the conduits into said expansion chamber whereby the valve can control flow of fluid through the conduit without applying noose-like forces to the conduit.

* * * * *